United States Patent [19]

Drexhage et al.

[11] 3,786,369
[45] Jan. 15, 1974

[54] LASER DYE COMPOSITION

[75] Inventors: Karl H. Drexhage; George A. Reynolds; Donald P. Specht, all of Rochester, N.Y.

[73] Assignee: Eastman Kodak Company, Rochester, N.Y.

[22] Filed: Dec. 27, 1972

[21] Appl. No.: 319,086

[52] U.S. Cl. ............................................. 331/94.5
[51] Int. Cl. ............................................. H01s 3/20
[58] Field of Search...................... 331/94.5; 330/4.3

[56] References Cited
UNITED STATES PATENTS

| | | | |
|---|---|---|---|
| 3,541,470 | 11/1970 | Lankard et al. | 331/94.5 |
| 3,681,252 | 8/1972 | Brecher et al. | 331/94.5 |
| 3,731,222 | 5/1973 | Drexhage | 331/94.5 |
| 3,736,524 | 5/1973 | Drexhage | 331/94.5 |

*Primary Examiner*—William L. Sikes
*Attorney*—Robert W. Hampton et al.

[57] ABSTRACT

This invention relates to the use of rigidized pyrylium, benzopyrylium, and xanthylium dyes as lasing media in dye lasers. Lasing media containing certain of these dyes have advantageously been found to lase in the red and near infrared region of the electromagnetic spectrum.

7 Claims, No Drawings

LASER DYE COMPOSITION

FIELD OF THE INVENTION

This invention relates to lasers and more particularly to the use of a certain class of dyes as lasing media for organic dye lasers.

DESCRIPTION OF THE PRIOR ART

Many of the materials discovered thus far which are capable of acting as lasing media have been in the solid or gaseous state. Solid lasers typically suffer from such disadvantages as cracking and optical imperfections. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly, organic dye laers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely, This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping." Pumping sources include, for example, sources such as giant pulse lasers, xenon and argon are flash tubes as well as arc discharge tubes containing only air or other gaseous mixtures.

Various arrangements of laser apparatus can be used. A laser structure particularly adapted for organic dye liquid laser media is described by Sorokin et al, IBM Journal, V. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, the effect of local heating which can cause refractive index discontinuities and potential breakdown of the dye is effectively circumvented. To provide an energy source for exciting the atoms of the laser material, the laser body can be surrounded concentrically by a lamp, such as one containing an annular region with an outer thick-walled quartz cylinder. The annular region can contain an air-argon mixture and have electrodes which are operably connected to a low inductance capacitor charged by a standard high voltage supply. Desirably, coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^0$), one of many possible energy levels in the singlet manifold. When the pumping source is activated, the resultant light pulse enters the laser body and photons of energy of appropriate absorptive wavelength and absorbed by active molecules in the body and cause the electrons of such molecules to shift from an initial low energy level ($S^0$) to a high energy level from which emissive transition occurs.

In operation, the molecular electrons of the laser medium are "pumped" to high excited states of the singlet system by intense energy inputs. It is thought that they then first undergo non-radiative transitions from such excited states to the lowest excited singlet state (designated $S^1$). After diminishing in energy level to the lowest excited singlet, the molecule can relinquish its remaining excess energy radiatively or non-radiatively from $S^1$ to $S^0$, non-radiatively from $S^1$ to a triplet state and then radiatively or non-radiatively from the lowest excited triplet state to $S^0$. Generally, laser emission consists of optical emission resulting from transitions from $S^1$ to various vibrational modes of $S^0$. Susceptibility to triplet formation upon pumping is deleterious due to accumulation of a large fraction of molecules in the long-lived triplet state. Also, if there is significant overlap between the triplet-triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules at the low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, the portion of the intense reflected light pulse passes through the one end and out of the cavity to constitute the laser output light pulse of the laser beam.

As is well known, many organic dyes do not possess or exhibit any useful lasing capabilities. For example, many pyrylium, benzopyrylium, and xanthylium dyes do not exhibit any useful lasing capability at any wavelength. As is also known, among the classes of organic dyes which do lase, at the present time there are relatively few organic dyes available which are known to lase in the red and near infrared portions of the spectrum.

SUMMARY OF THE INVENTION

In accord with the present invention it has been discovered that rigidized pyrylium, benzopyrylium and xanthylium dyes are useful as lasing media in liquid dye lasers. This class of dyes has been found particularly useful because many of the dyes in this class lase in the red and near infrared region of the electromagnetic spectrum, i.e., from about 500 nm to about 800 nm. At the present time there are few known classes of dyes which will lase effectively in this region of the spectrum. The fact that many of the dyes useful in the present invention lase in the red and near infrared portions of the spectrum is not only advantageous but also somewhat surprising since many of the related non-rigidized pyrylium, benzopyrylium and xanthylium dyes exhibit little if any fluorescence and therefore do not possess useful lasing capability.

The present invention is implemented through the use of a rigidized pyrylium, benzopyrylium, or xanthylium dye with dye lasers having a reservoir means containing a laser dye solution and a pumping energy source capable of producing stimulated emission of the solution which comprises a lasing concentration of dye in a non-interfering solvent (i.e., one that does not inhibit stimulated emission).

Typical of the above-described dyes useful in the present invention are rigidized dyes, having the following formula:

I.
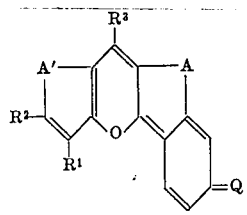

wherein Q represents an iminium group having the formula $=N^+R^4R^5X^-$, an oxonium group having the formula $=O^+R^6X^-$, or an oxo group having the formula $=O$;

A represents an ethylene group having the formula $-CH_2-CH_2-$, a vinylene group having the formula $-CH=CH-$, or an iminocarbonyl group having the formula

the carbon atom of the aforementioned iminocarbonyl group bonded directly to the central pyran ring;

A' represents one of the aforementioned groups specified for A or a group having the following formula

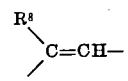

the carbon atom of said group which is bonded to $R^8$ being adjacent the carbon atom bonded to $R^2$ of formula I above;

$R^1$ represents (1) a hydrogen atom, (2) or when taken together $R^1$ and $R^2$ represent a substituted butadienylene group having the formula

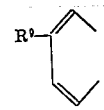

wherein $R^9$ represents an amino group having the formula $-NR^4R^5$, or a group having the formula $MO-$, wherein M represents a hydrogen atom, an unsubstituted alkyl group having from one to about 10 carbon atoms, a phenyl group, or a cation, or (3) when taken together $R^1$, $R^2$, and $R^8$ represent a tervalent group having the formula

$R^2$ represents an amino group as described hereinabove, a hydrocarbyloxy group having the formula $-OR^6$, a hydroxy group, or is taken together with $R^1$ or with $R^1$ and $R^8$ as described hereinabove;

$R^3$ represents a hydrogen atom, an alkyl group including branched chain and substituted alkyl groups, especially hydroxy or carboxy (as defined below) substituted alkyl groups having one to about ten carbon atoms in the alkyl chain, or an aryl group such as mono- and polycyclic aryl groups having six to 14 atoms in the nucleus, such as phenyl, p-tolyl, naphthyl, anthryl, etc, including substituted aryl groups having such substituents as hydroxy groups, unsubstituted alkoxy groups having up to about 10 carbon atoms, and carboxy groups having the formula $-COOM$, wherein M is as defined hereinbefore.

$R^4$, $R^5$, and $R^6$, which may be the same or different, each represent an alkyl group including branched chain and substituted alkyl groups as defined hereinabove, a phenyl group, or a substituted phenyl containing a hydroxy, alkoxy, or carboxy substitutent as defined hereinabove;

$R^7$ represents a hydrogen atom or one of the groups specified hereinabove for $R^4$, $R^5$ and $R^6$;

$R^8$ represents a hydrogen atom or is taken together with $R^1$ and $R^2$ as defined hereinabove;

and X represents an anion;

with the provisos that (1) Q represents an iminium group when $R^8$ is taken together with $R^1$ and $R^2$ to form the above-mentioned tervalent group, and (2) Q represents an oxo group when $R^1$ and $R^2$ are taken together to form a substituted butadienylene group as defined hereinabove wherein the substituents R⁹ of the butadienylene group has the formula MO— wherein M represents a cation.

A partial list of the wide variety of typical anions from which X may be selected includes chloride, bromide, iodide, persulfate, sulfate, aromatic sulfonates such as p-toluene-sulfonate and benzene sulfonate, acid anions derived from carboxylic acids like acetate, trifluoroacetate, propionate, benzoate, etc. In general, any anion may be used as the specific anion selected is not particularly critical.

A partial list of the wide variety of typical cations from which M may be selected includes metal; especially alkali and alkaline earth metals such as sodium, lithium, potassium, rubidium, calcium, strontium, barium, and magnesium; ammonium groups having the formula

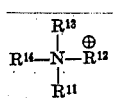

wherein $R^{11}$, $R^{12}$, $R^{13}$, $R^{14}$, being the same or different, represent hydrogen, alkyl groups including branched chain and substituted alkyl groups as defined hereinabove, or aryl groups as defined hereinabove. in general any cation may be used as the specific cation is not particularly critical.

Especially advantageous rigidized dyes useful in the present invention include dyes having formula I above wherein the groups A and A' represent the same chemical moiety and are selected from the group consisting of the above defined ethylene, vinylene, and iminocarbonyl groups.

Another especially advantageous group of rigidized dyes useful in the present invention having formula I above include dyes wherein R³ is a hydrogen atom and wherein at least one of the groups A and A' represent the above-defined imino-carbonyl group.

Still another especially advantageous group of rigidized dyes useful in the present invention having formula I above include those dyes wherein A and A' represent a vinylene group or an ethylene group and wherein R³ is a substituted phenyl group bearing a hydroxy, alkoxy, or carboxy substituent as defined hereinabove.

Those dyes characterized immediately hereinabove as especially advantageous for use in the present invention are so designated because they lase in the red and near infrared region of the electromagnetic spectrum. An exemplary partial listing of these dyes includes (1) 5-aza-5,6-dihydro-10-dimethylamino-5-methyl-6-oxo-3H-benzo[c]xanthene-3-ylidene-dimethyliminium chloride having the formula

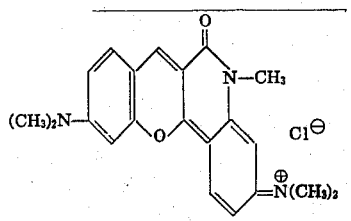

(2) salts such as metal or ammonium salts of 7-(2-carboxy-phenyl)-3-hydroxy-11-oxo-11H-dibenzo-[c,h]xanthene, for example, dye having the formula

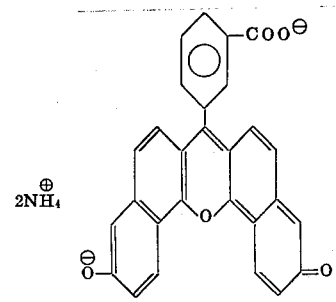

(3) 5,9-diaza-3-dimethylamino-5,9-dimethyl-6,8-dioxo-5,6,8,9-tetrahydro-11H-dibenzo[c,h]-xanthene-11-ylidenedimethyliminium chloride having the formula

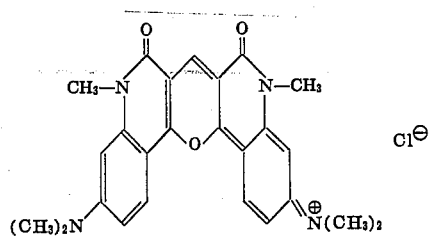

(4) dimethyl-9,10-dihydro-10-methyl-9-oxo-12H-julolidino-[8,9-b]quinolino[3,4-e]pyran-12-ylideneiminium chloride having the formula

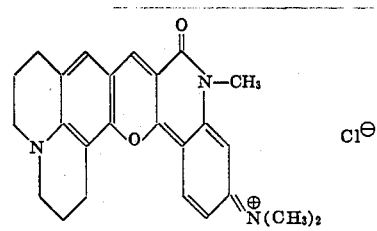

and (5) 3-methoxy-7-(4-methoxyphenyl)-5,6,8,9-tetrahydro-11H-dibenzo[c,h]xanthene-11-ylidenemethyloxonium chloride having the formula

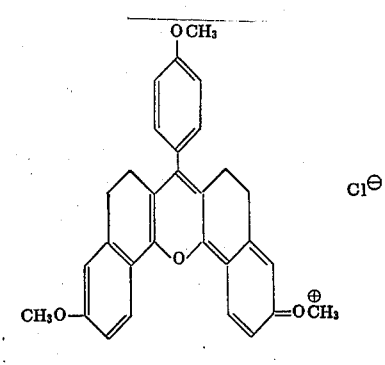

The dye compounds used in the invention are known or are similar to known compounds and procedures for their preparation can be found in Chem. Ber. 47, 1076 (1914); ibid 50, 1011 (1917); Annalen der Chemie 740, 164 (1970); and ibid 751, 155 (1971). Note that certain of these compounds are referred to in the literature as fluoranes. It is to be understood that fluoranes can exist in the form represented by their classical structure when isolated from neutral or weakly acidic media,

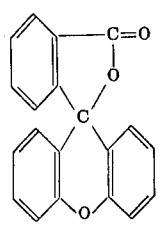

or in the form represented herein, i.e., 2-carboxyphenyl-substituted polycyclic pyrans, when isolated from strong acids, or as metal or ammonium salts of 2-carboxyphenyl-substituted polycyclic pyrans, i.e., as so-called carbinol bases, when isolated from strong base; therefore, it is intended that all variations of the structures shown resulting simply from pH adjustment with various acids or bases are within the scope of the invention.

The fluoran derivatives and analogs of the invention are prepared by reacting 6-amino or 6-hydroxy-1-naphthols with phthalic anhydride in the presence of fused zinc chloride to obtain [c,h] dibenzofluoranes which are then isolated in any of the forms specified above by known techniques as described in the above cited Chem. Ber. references.

Other compounds of the invention are prepared by the reaction of a 7-alkoxy-, or 7-dihydrocarbylamino-, or 7-hydroxy-substituted 4-chloro-3-formylnaphthalene, or 4-chloro-3-formyl-1,2-dihydronaphthalene, or 4-chloro-3-formyl-2-quniolone with a phenol selected from an 8hydroxyjololidine or an alkoxy-, or a 7-dihydrocarbylamino, or a hydroxy-substituted phenol or naphthol in the presence of acid as described in the above cited Annalen der Chemie references. These preparations are illustrated in the following examples.

It will be observed that the lasing dye utilized in the present invention are in ionized or salt form when they exhibit stimulated emission in a laser dye solution. Although most of the dye preparation procedures referred to above describe the formation of the ionized or salt form of the dyes utilized in the invention, it may be noted that certain of these procedures describe only the preparation of the un-ionized dye. For example, the dye preparation procedure described in Example 1 hereinafter and described further in Chem. Ber. 47 and 50 produces an un-ionized dye. In such case, the un-ionized dye may be conveniently converted to its ionized or salt form by dissolving the dye in a suitable lasing solvent (as described hereinafter in greater detail) containing a small amount of a material capable of forming a salt of the dye in the solvent, for example, a suitable organic base, e.g., trialkyl amine, or inorganic base, e.g., sodium hydroxide.

As used herein, the term "lasing concentration" refers to a concentration sufficient to promote, under appropriate conditions such as those mentioned herein, stimulated emission of the laser dye solution. Generally, concentrations of from about $10^{-1}$ to $10^{-6}$ molar are employed, with solutions of from $10^{-2}$ to $10^{-5}$ molar concentrations being preferred for maximum output energies. Still wider variations in concentration can be used for particular operations, if desired.

Representative useful non-interfering solvents which do not inhibit or otherwise prevent stimulated emission are water; alkanols, including mono-, di- and polyhydric alcohols containing from one to about six carbon atoms and preferably from two to about four carbon atoms, e.g., methanol, ethanol, isopropanol, iso- propanediol, butanol, etc.; and aryl alcohols such as various benzene derivatives wherein the hydroxy radical is attached directly to the aryl nucleus or is attached thereto through an alkylene moiety having from one to about four carbon atoms, e.g., phenol, methylphenol, resorcinol, phenylcarbinol, methylphenylcarbinol, etc. Other solvents include fluorinated organic alcohols corresponding to the alcohols described above and discussed further in copending Drexhage application Ser. No. 149,055, now U.S. Pat. No. 3,736,524 filed June 1, 1971, and entitled LASER MEDIA CONTAINING FLUORINATED ALCOHOLS, also heterocyclic compounds having a nitrogen heteroatom (e.g., pyridine 2,6-dimethylpryidine, etc.), and lower alkyl ketones such as acetone. Additional useful solvents include alkyl-substituted solvents such as dimethylsulfoxide, dimethylacetamide, dimethyl-formamide and the like as well as deuterated counterparts of various solvents such as those described above. Of course, combinations of liquids can be used as can other solvents known to be useful in the dye laser art. For example, solid host solvents can be used to form solid solutions of the dye. Acrylic or methacrylic polymers such as poly(methylmethacrylate) are useful for this purpose. Gelatin is another useful vehicle for lasing dyes. See O. G. Peterson and B. B. Snavely, *Appl. Phys. Let.*, Vol. 12, p. 238, 1968; B. H. Soffer and B.B. McFarland, *Appl. Phys. Let.*, Vol. 12, 1967; H. Kogelnick et al., *Appl. Phys. Let.*, Vol. 16, p. 499, 1970.

The present lasing media can be used in a variety of laser apparatus. A laser structure particularly adapted for testing organic dye liquid laser media is that described by Sorokin et al, *IBM Journal*, (supra). For continuous operation, the present lasing media can be used in apparatus of the type described in copending application of S. A. Tuccio and O.G. Peterson, Ser. No. 117,595, filed Feb. 22, 1971 and entitled CW ORGANIC DYE LASER.

The following examples are included for a further understanding of the invention. Unless otherwise stated, the excitation source in the following examples is a giant pulse from a 530.0 nm. frequency doubled, neodymium glass laser. The dye lasing medium is placed in a cuvette which is located between two dielectric mirrors which form a nearly hemispherical dye laser activity. The light from the excitation or pumping source passes through one of the dielectric mirrors into the dye-containing cuvette and along the optical axis of the cavity. A beam splitter is used to sample the output from the excitation source in order to determine the wavelength of lasing.

EXAMPLE 1

Preparation of 7-(2-carboxyphenyl)-3-hydroxy-11-oxo-11H-dibenzo-[c,h]xanthene [See Chem. Ber. 47, 1076 (1914) and Chem. Ber. 50, 1011 (1917)].

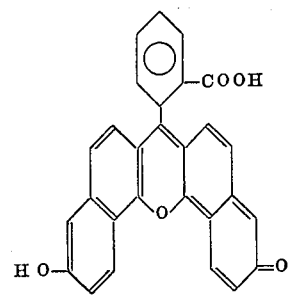

A mixture of 4g of 1,6-dihydroxynaphthalene and 1.9g of phthalic anhydride is ground in a mortar and then heated to 180°C in an oil bath. While stirring with a glass rod, 0.9g of fused zinc chloride is added and the temperature is raised to, and maintained at 210°C until the mass is completely solidified. The mass is removed, powdered, and boiled with 25 ml of 5 percent hydrochloric acid. The insoluble material remaining is collected and washed with water.

A sample of this material added to dilute ammonia solution produces a blue-green color and red fluorescence. The remainder of the dye is dissolved in hot, dilute sodium hydroxide solution, the solution filtered, and the filtrate is cooled and acidified with acetic acid. The red solid is collected, washed with water and dried to produce 3g of product.

EXAMPLE 2

Preparation of 5-aza-5,6-dihydro-10-dimethylamino-5-methyl-6-oxo-3H-benzo [c]xanthene-3-ylidenedimethyliminium chloride [See Annalen der Chemie 740, 164 (1970) and ibid 751, 155 (1971)].

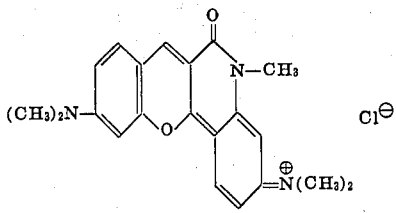

One gram of 4-chloro-7-dimethylamino-3-formyl-1-methyl-2(1H)-quinolone and 0.5g of m-dimethylaminophenol in 15 ml of acetic acid are heated at reflux for 2 hours and then poured into 75 ml of water. Saturated sodium chloride solution is added to precipitate the dye. The solid is collected and triturated with dioxane to give 0.9 g of product.

A sample of the dye gives a purple solution with a red fluorescence.

EXAMPLE 3

Preparation of 5,9-diaza-3-dimethylamino-5,9-dimethyl-6,8-diozo-5,6,8,9-tetrahydro-11H-dibenzo[c,h]-xanthene-11-ylidenedimethyliminium chloride [See Annalen der Chemie 751, 155 (1971)].

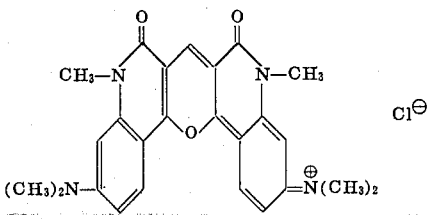

A mixture of 0.5 g of 4-chloro-7-dimethylamino-3-formyl-1-methyl-2(1H)-quinolone and 0.4 g of 7-dimethylamino-4-hydroxy-1-methyl-2(1H)-quinolone in 5 ml of acetic acid is heated to reflux. A green color soon forms and does not change while refluxing is contained for about 1 hour. The mixture is allowed to stand after adding 45 ml of water saturated with sodium chloride. The precipitated dye is collected and extracted several times with small amounts (7 ml) of hot chloroform to remove a yellow impurity. Yield = 0.4 g product.

EXAMPLE 4

Preparation of dimethyl-9,10-dihydro-10-methyl-9-oxo-12H-juloidino [8,9-b]quinolino[3,4-e]pyran-12-ylidene-iminium chloride.

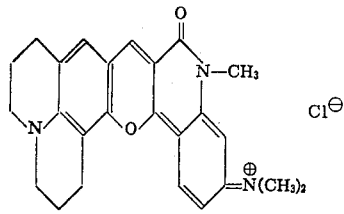

A mixture of 1.9 g of 8-hydroxyjuloidine, 2.6g of 4-chloro-7-dimethylamino-3-formyl-1-methyl-2(1H)-quinolone and 25 ml of acetic acid was heated at reflux for 1 hour, cooled, and poured into 100 ml of water saturated with sodium chloride. The liquid was decanted from the gummey material which formed and the gum was washed with water then triurated with dioxane to solidify the product. Yield = 1.3 g of product having a mp of 210°-212°C.

EXAMPLE 5

3-methoxy-7-(4-methyoxyphenyl-5,6,8,9-tetrahydro-11H-dibenzo[c,h]xanthene-11-ylidenemethyloxonium chloride.

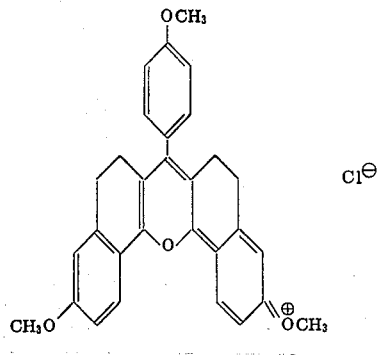

A mixture of 8.8 g of 6-methoxytetralone, 4.5 g of anisaldehyde, and 9 ml of phosphoryl chloride is heated at 55°C for 4 hours. The phosphoryl chloride is removed under reduced pressure while heating on a steam bath. The residue is extracted several times with boiling water and the product precipitated by the addition of concentrated hydrochloric acid to the hot extracts. The product is recrystallized from water and has a m.p. of 223°C.

A second crop of crystals is obtained by the addition of a small amount of hydrochloric acid to the mother liquor, heating to dissolve the precipitate, and cooling to room temperature. The m.p. of these crystals is 225°C.

EXAMPLE 6

The dye of Example 5 is mixed in methanol to an optical density of about 2 at 537 nm in a 5cm path length dye cuvette. The cuvette is placed between two dielectric mirrors which form a dye laser cavity. The dye is optically excited by a giant pulse from a 5300 A frequency doubled neodymium glass laser. The pumping configuration is longitudinal, that is, the pump light is poured through one of the dielectric mirrors into the dye cuvette along the optical axis of the dye laser cavity. The dye is found to lase at a wavelength of about 574 nm.

EXAMPLE 7

The dye of Example 1 is tested as in Example 6 except that the solvent is aqueous NaOH (0.1 normal) and the dye lases at about 694 nm. The dye is also dissolved in a basic methanol solvent and lases at about 702 nm. The dye is also dissolved in a basic trifluoroethanol solvent and lases at about 683 nm.

EXAMPLE 8

The dye of Example 2 is tested as in Example 6 except that the dye solvent is methyl alcohol. The dye lases at about 664 nm. The dye is also dissolved in dichloromethane and lases at about 655 nm. The dye is also dissolved in ethyl alcohol and lases at about 650 nm. The dye is also dissolved in hexafluoroisopropanol and lases at about 640 nm.

EXAMPLE 9

The dye of Example 3 is tested as in Example 6 except that the solvent is ethyl alcohol and the dye lases at about 729 nm. The dye is also dissolved in hexafluoroisopropanol and lases at about 720 nm.

EXAMPLE 10

The dye of Example 4 is tested as in Example 6 except that the solvent is methanol and the dye lases at about 667 nm. The dye is also dissolved in dichloromethane and lases at about 652 nm. The dye is also dissolved in ethyl alcohol and lases at about 645 nm. The dye is also dissolved in hexafluoroisopropanol and lases at about 645 nm.

The invention has been described in detail with particular reference to certain preferred embodiments thereof, but it will be understood that variations and modifications can be effected within the spirit and scope of the invention.

We claim:

1. A dye laser comprising a laser dye solution and a pumping energy source operably coupled therewith and capable of producing stimulated emission of the dye solution, said dye solution comprising a lasing concentration in a non-interfering solvent of a dye having a formula as follows:

I.

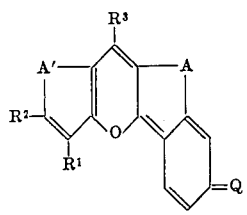

wherein
Q is selected from the group consisting of an iminium group, an oxonium group, and an oxo group;
A is selected from the group consisting of an ethylene group, a vinylene group, and an iminocarbonyl group having the formula

the carbon atom of said group bonded directly to the central pyran ring;
A' is selected from the aforementioned group defined for A and a group having the formula

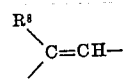

the carbon atom of said group which is bonded to $R^8$ being adjacent the carbon atom bonded to $R^2$ of formula I;
$R^1$ is (1) a hydrogen atom, or (2) when taken together $R^1$ and $R^2$ represent a substituted butadienylene group having the formula

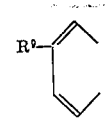

wherein $R^9$ is selected from the group consisting of an amino group and a group having the formula MO— wherein M is selected from the group consisting of a hydrogen atom, an unsubstituted alkyl group, a phenyl group, or a cation, or (3) when taken together $R^1$, $R^2$, and $R^8$ represent a tervalent group having the formula

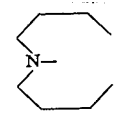

$R^2$ is selected from the group consisting of an amino group, a hydrocarbyloxy group having the formula $-OR^6$, a hydroxy group, or is taken together with $R^1$ or with $R^1$ and $R^8$ as defined above;
$R^3$ is selected from the group consisting of a hydrogen atom, an alkyl group, and an aryl group;
$R^4$, $R^5$, and $R^6$, which may be the same or different, are selected from the group consisting of an alkyl group and a phenyl group;
$R^7$ is selected from the group consisting of hydrogen and the group defined above for $R^4$, $R^5$, and $R^6$;
$R^8$ is a hydrogen atom or is taken together with $R^1$ and $R^2$ as defined above; and
with the provisos that (1) when $R^1$, $R^2$, and $R^8$ are taken together to form the above-defined tervalent group, Q must be an iminium group and (2) when $R^1$ and $R^2$ are taken together to form a cationic substituted butadienylene group as defined above, Q must be an oxo group.

2. The invention of claim 1 wherein said dye is present in a concentration of about $10^{-2}$ to about $10^{-6}$ molar.

3. A method of producing coherent laser emission which comprises pumping a dye solution containing between about $10^{-2}$ to about $10^{-6}$ molar concentration of lasing dye in a non-interfering solvent, said dye having the following formula:

I.

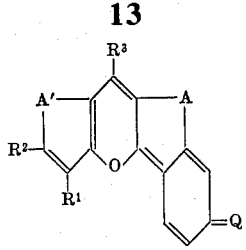

wherein

Q is selected from the group consisting of an iminium group, an oxonium group, and an oxo group;

A is selected from the group consisting of an ethylene group, a vinylene group, and an iminocarbonyl group having the formula

the carbon atom of said group bonded directly to the central pyran ring;

A' is selected from the aforementioned group defined for A and a group having the formula

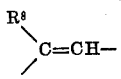

the carbon atom of said group which is bonded to $R^8$ being adjacent the carbon atom bonded to $R^2$ of formula I;

$R^1$ is (1) a hydrogen atom, or (2) when taken together $R^1$ and $R^2$ represent a substituted butadienylene group having the formula

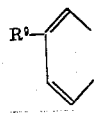

wherein $R^9$ is selected from the group consisting of an amino group and a group having the formula MO— wherein M is selected from the group consisting of a hydrogen atom, an unsubstituted alkyl group, a phenyl group, or a cation, or (3) when taken together $R^1$, $R^2$, and $R^8$ represent a tervalent group having the formula

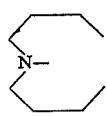

$R^2$ is selected from the group consisting of an amino group, a hydrocarbyloxy group having the formula —$OR^6$, a hydroxy group, or is taken together with $R^1$ or with $R^1$ and $R^8$ as defined above;

$R^3$ is selected from the group consisting of a hydrogen atom, an alkyl group, and an aryl group;

$R^4$, $R^5$, and $R^6$, which may be the same or different, are selected from the group consisting of an alkyl group and a phenyl group;

$R^7$ is selected from the group consisting of hydrogen and the group defined above for $R^4$, $R^5$, and $R^6$;

$R^8$ is a hydrogen atom or is taken together with $R^1$ and $R^2$ as defined above; and with the provisos that (1) when $R^1$, $R^2$, and $R^8$ are taken together to form the above-defined tervalent group, Q must be an iminium group and (2) when $R^1$ and $R^2$ are taken together to form a cationic substituted butadienylene group as defined above, Q must be an oxo group.

4. The invention as described in claim 3 wherein coherent laser emission within the range of about 500 to about 800 nm. is produced and wherein the groups A and A' represent the same chemical moiety and are selected from the group consisting of ethylene, vinylene, and iminocarbonyl groups as defined in claim 3.

5. The invention as describpd in claim 3 wherein coherent laser emission within the range of about 500 to about 800 nm. is produced and wherein the group $R^3$ is a hydrogen atom and wherein at least one of the groups A and A' is an iminocarbonyl group as defined in claim 3.

6. The invention as described in claim 3 wherein coherent laser emission within the range of about 500 to about 800 nm. is produced and wherein A and A' are selected from the group consisting of a vinylene group and an ethylene group and wherein $R^3$ is a phenyl group bearing a hydroxy, alkoxy, or carboxy substituent.

7. The invention as described in claim 3 wherein coherent laser emission within the range of about 500 to about 800 nm. is produced and wherein said dye is selected from the group consisting of 5-aza-5,6-dihydro-10-dimethylamino-5-methyl-6-oxo-3H-benzo[c]xanthene-3-ylidene-dimethyliminium chloride; metal or ammonium salt of 7-(2-carboxyphenyl)-3-hydroxy-11-oxo-11H-dibenxo-[c,h]xanthene; 5,9-diaza-3-dimethylamino-5,9-dimethyl-6,8-dioxo-5,6,8,9-tetrahydro-11H-dibenzo[c,h]-xanthene-11-ylidenedimethyliminium chloride; dimethyl-9,10-dihydro-10-methyl-9-oxo-12H-julolidino-[8,9-b]quinolino[3,4-e]pyran-12-ylideneiminium chloride; and 3-methoxy-7-(4-methoxyphenyl)-5,6,8,9-tetrahydro-11H-dibenzo[c,h]xanthene-11-ylidenemethyloxonium chloride.

* * * * *